(12) United States Patent  
Atwater et al.

(10) Patent No.: US 8,428,159 B2  
(45) Date of Patent: Apr. 23, 2013

(54) MIMO RECEIVER USING MAXIMUM LIKELIHOOD DETECTOR IN COMBINATION WITH QR DECOMPOSITION

(75) Inventors: Geert A. Atwater, Utrecht (NL); Brian Wong, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 937 days.

(21) Appl. No.: 12/367,971

(22) Filed: Feb. 9, 2009

(65) Prior Publication Data

US 2009/0190683 A1 Jul. 30, 2009

Related U.S. Application Data

(63) Continuation of application No. 11/112,068, filed on Apr. 22, 2005, now Pat. No. 7,489,746.

(60) Provisional application No. 60/564,779, filed on Apr. 22, 2004.

(51) Int. Cl.  
*H04K 1/10* (2006.01)  
*H04L 27/28* (2006.01)

(52) U.S. Cl.  
USPC ............ 375/260; 375/262; 375/265; 375/324

(58) Field of Classification Search ............... 375/260, 375/299, 267, 347  
See application file for complete search history.

(56) References Cited

U.S. PATENT DOCUMENTS

| | | | |
|---|---|---|---|
| 5,375,129 A | 12/1994 | Cooper | |
| 6,314,147 B1 | 11/2001 | Liang et al. | |
| 6,526,104 B1 | 2/2003 | Hutchins et al. | |
| 7,218,665 B2 | 5/2007 | McElwain | |
| 7,233,634 B1 * | 6/2007 | Hassell Sweatman et al. | ............................. 375/346 |
| 7,289,585 B2 * | 10/2007 | Sandhu et al. | ................ 375/347 |
| 7,296,045 B2 | 11/2007 | Sehitoglu | |
| 7,317,771 B2 | 1/2008 | Bruel | |
| 7,489,746 B1 | 2/2009 | Awater et al. | |
| 2002/0150109 A1 | 10/2002 | Agee | |
| 2003/0086514 A1 | 5/2003 | Ginis et al. | |
| 2004/0174939 A1 | 9/2004 | Wang | |

OTHER PUBLICATIONS

Damen et al; "On Maximum-Likelihood Detection and the Search for the Closest Lattice Point", IEEE Transactions on Information Theory, vol. 49, Oct. 2003.*

(Continued)

*Primary Examiner* — Daniel Washburn  
*Assistant Examiner* — Qutbuddin Ghulamali  
(74) *Attorney, Agent, or Firm* — Kenyon S. Jenckes

(57) ABSTRACT

A MIMO receiver is provided with a preprocessor for performing QR decomposition of a channel matrix H wherein the factored reduced matrix R is used in place of H and Q*y is used in place of the received vector y in a maximum likelihood detector ("MLD"). The maximum likelihood detector might be a hard-decision MLD or a soft-decision MLD. A savings of computational complexity can be used to provide comparable results more quickly, using less circuitry, and/or requiring less consumed energy, or performance can be improved for a fixed amount of time, circuitry and/or energy. Where the MLD uses approximations, such as finite resolution calculations (fixed point or the like) or L1 Norm approximations, the reduced number of operations resulting from using the reduced matrix results in improved approximations as a result of the finite resolution operations. Other methods of reducing the channel matrix might be used for suitable and/or cumulative advantages.

19 Claims, 9 Drawing Sheets

OTHER PUBLICATIONS

Vaton, S. et al., "Approximate and exact ML detectors for CDMA and MIMO systems: a treedetection approach," MMT, 2002, Rennes, France, Mat 2002, 31 pages.

Verdult, V., et al., "Identification of Fully Prameterized Liner and Nonlinear State-Space Systems by Projected Gradient Search," Proceedings of the 13th IFAC Symposium on Systems Identification, Aug. 2003, Rotterdam, The Netherlands, 6 pages.

Vikalo, H., et al., "Maximum-Likelihood Sequence Detection of Multiple Antenna Systems over Dispersive Channels via Sphere Decoding," Eurasip Journal on Applied Signal Processing, vol. 2002, No. 5. May 2002, pp. 523-531.

Vikalo, H., et al., "Sphere Decoding Algorithms for Digital Communications," Ph.D Thesis, Stanford University, Dept. of Electrical Engineering, 2003, 172 pages.

Yao, H., "Efficient Signal, Code, and Receiver Designs for MIMO Communication Systems," Ph.D., Thesis, MIT Dept. of EECS, May 21, 2003, 205 pages.

* cited by examiner

```
void cordic_qr(matrix H, vector y)
// calculates R = Q*H and y' = Q*y
{
   for (int c=0; c<M; c++)
      for(int r=N-1; r>c; r--){
         complex_cordic(VECTOR,H[c][r-1],H[c][r]);
         for (int j=c+1; j<M; j++)
            complex_cordic(ROTATE,H[j][r-1],H[j][r]);
         complex_cordic(ROTATE,y[r-1],y[r]);
      }
}
void complex_cordic(MODE mode, complex& x, complex& y)
{
   static double // storage for rotation angles
      angle1,
      angle2,
      angle3;
   real_cordic(mode,real(x),imag(x),angle1);
   real_cordic(mode,real(y),imag(y),angle2);
   real_cordic(mode,imag(x),imag(y),angle3);
   real_cordic(mode,real(x),real(y),angle3);
}
void real_cordic( // functional description
   MODE mode, double& x, double& y, double angle )
{
   if (mode == VECTOR){
      angle = -atan (y/x)
      x = hypot(x,y);
   }
   else{ // mode == ROTATE
      double
         rot_x = cos(angle)*x - sin(angle)*y,
         rot_y = sin(angle)*x + cos(angle)*y;
      x = rot_x;
      y = rot_y;
   }
}
```

Fig. 8

MIMO RECEIVER USING MAXIMUM LIKELIHOOD DETECTOR IN COMBINATION WITH QR DECOMPOSITION

CROSS-REFERENCE TO RELATED APPLICATIONS

This application is a continuation under 35 U.S.C. §120 of U.S. patent application Ser. No. 11/112,068 filed on Apr. 22, 2005 and entitled "MIMO RECEIVER USING MAXIMUM LIKELIHOOD DETECTOR IN COMBINATION WITH QR DECOMPOSITION and claims priority from U.S. Provisional Patent Application No. 60/564,779 filed Apr. 22, 2004 entitled "MIMO RECEIVER USING REDUCED-COMPLEXITY MAXIMUM LIKELIHOOD DETECTOR IN COMBINATION WITH QR DECOMPOSITION." The entirety of the aforementioned applications are incorporated herein by reference.

BACKGROUND OF THE INVENTION

Wireless networks have become increasingly popular, as computers and other devices can be coupled for data communications without requiring wired connections between the network nodes. One set of standards for wireless networks is the IEEE 802.11 standards, but other wireless standards or protocols might be used instead. Because wireless networks are expected to operate in unfavorable conditions, such as in the presence of reflections, interference, movement of receivers/transmitters, etc., much effort is needed to correctly transmit and receive data over a wireless channel.

A typical node in a wireless network (referred to in the standards as a "station") includes a receive chain and a transmit chain. A transmit chain typically includes some digital processing and analog circuitry (RF, baseband, etc.) that causes a signal to be transmitted into the wireless channel. A receive chain typically includes one or more antenna, RF circuitry and other analog circuitry, and digital processing that seeks to output a data stream that represents what the sending transmit chain received as its input and transmitted into the wireless network. Of course, where there are unrecoverable errors, there is a mismatch between what the sending transmit chain received and what the receiving receive chain outputs. In some cases, a receiver uses multiple antennas to improve reception of the signal from a sending transmit chain.

Because of the expected conditions, the receive chain includes various components designed to ensure that signals can be largely recovered correctly. Several techniques have been in use to recover signals. One technique is the use of MIMO (multiple-input, multiple-output) channels and another technique is the use of a maximum likelihood detector (MLD) to determine at the receiver the probabilities of what the transmitter sent and select the one or more most likely transmissions. MIMO is also used to increase bandwidth for given conditions and/or to improve reception without increased bandwidth.

In the IEEE 802.11 standards, there are at least two widely-used standards, 802.11a and 802.11b, and communication systems and devices might be required to support both standards and/or be required to operate in areas where both are being used. Enhancements to the 802.11 standards have been in place, such as the 802.11g standard that allows for OFDM transmissions (802.11a is an OFDM transmission protocol) in the 2.4 GHz band.

The 802.11a protocol supports OFDM transmissions in the 5 GHz band for data rates of 6 to 54 million bits per second ("Mbps"). The 802.11b protocol supports DSSS transmissions in the 2.4 GHz band for data rates of 1, 2, 5.5 and 11 Mbps. The 802.11g protocol mixes OFDM and DSSS protocols in the 2.4 GHz band for data rates of 1, 2, 5.5, 6, 9, 11, 12, 18, 24, 36, 48 and 54 Mbps. Data transmissions are well known for these protocols, so they need not be set forth herein. They are described, for example, in ANSI/IEEE Std 802.11, 1999 Edition; IEEE Std 802.11b, 1999; IEEE Std 802.11a, 1999/Amd 1:2000(E). Those references are incorporated by reference herein for all purposes.

MIMO systems have advantages over SISO (single-input, single-output) systems, but MIMO receivers require more processing than SISO receivers. A MIMO system comprises at least a transmitter that transmits a number of bits, or a stream of bits, over a transmission medium to a receiver. Typically, the transmission medium is a wireless radio channel but the other media such as multi-mode fiber might be used instead. A MIMO system comprises M transmit streams and N receive antennas (spatially separated, separated by polarization, or otherwise separated), where M and N are each integers greater than one (except for degenerate cases of M=1 and/or N=1, wherein MIMO techniques would work, but not provide as much benefit). Thus, an MIMO transmitter transmits its data as M streams and a receiver processes its inputs as N inputs.

A MIMO transmitter might comprise an encoder that first applies a forward error correcting (FEC) code on the bit stream that is to be received at an output of the receiver. The FEC code could be a block code, a convolution code or other code or codes. The coded bit stream is distributed by a de-multiplexer over M transmit streams. Many of the examples below use M=2 as an example, but it should be understood that the examples can be expanded to other values of M. The same is true for N, and M and N need not be the same value. In any case, the distributed, coded transmit streams are modulated and transmitted. As an example, bits for a transmit stream might be divided in groups of two bits and modulated onto a carrier using QPSK (Quaternary Phase Shift Keying) modulation, which maps the bits onto complex transmit symbols as shown in Table 1.

TABLE 1

| Input bit group | Complex Transmit Symbol |
| --- | --- |
| 00 | $+1 + j \cdot 0$ |
| 01 | $0 + j \cdot 1$ |
| 10 | $-1 + j \cdot 0$ |
| 11 | $0 - j \cdot 1$ |

More or less advanced modulation techniques are possible, such as BPSK (mapping one bit at a time), 16-QAM (mapping groups of four bits), 64-QAM (mapping groups of six bits), etc. In general, for a transmit constellation size of c, a MIMO transmitter transmits $M \cdot (\log_2 c)$ bits per symbol period, whereas a single antenna system transmits $(\log_2 c)$ bits per symbol period. Herein, the transmit symbol for a particular symbol period on a transmit antenna i is denoted as $x_i$. The transmit symbols for a symbol period can be represented as an M-dimensional vector x. These symbols are up-converted to radio frequency, transmitted and then received by N antennas at the receiver. The receiver converts the signal down to baseband frequency and, at the output of the N down-converters, N received symbols denoted as $y_1$ through $y_N$ are available. Those received symbols can be represented by an N-dimensional vector y.

Taking into account the N×M complex channel matrix, H, and a complex noise vector n, the current received symbol vector (i.e., the symbols received in a current symbol period at the receiver) can be represented as a function of the current transmitted symbol vector as shown in Equation 1 and expanded in Equation 2. By convention, scalar values are represented herein by normal characters, vectors are represented herein by bolded lowercase characters and matrices are represented herein by uppercase bolded characters. The scalar values and the components of the vectors and matrices can be real or complex values, unless otherwise indicated.

$$y = Hx + n \quad \text{(Equ. 1)}$$

$$\begin{bmatrix} y_1 \\ \vdots \\ y_N \end{bmatrix} = \begin{bmatrix} h_{11} & \cdots & h_{1M} \\ \vdots & \ddots & \vdots \\ h_{N1} & \cdots & h_{NM} \end{bmatrix} \begin{bmatrix} x_1 \\ \vdots \\ x_M \end{bmatrix} + \begin{bmatrix} n_1 \\ \vdots \\ n_N \end{bmatrix} \quad \text{(Equ. 2)}$$

A maximum likelihood detector ("MLD") can be used with an FEC decoder to decode transmissions. A detector might provide hard decisions (in the case of a detector with hard decision outputs) or soft decisions (in the case of a soft decision output detector) to an FEC decoder, which would then perform the inverse of what an encoder did to the data prior to transmission and, when there are no unrecoverable errors, the FEC decoder outputs what was input to the encoder.

The detector combines received symbols and either estimates the transmitted bits to provide a hard decision (e.g., a "1" or a "0") or produces a soft decision value for each transmitted bit representing a measure for the probability that the transmitted bit is "1" (or "0"). By quantizing the soft decision values, the soft decision detector is reduced to a hard decision detector.

Suppose a hard-decision detector operates over a MIMO channel characterized by (M, N, c), i.e., a MIMO system with M transmit antennas (possibly comprising polarizations), N receive antennas (possibly comprising polarizations) and a constellation of size c. Assume that the receiver has learned H. Typically, packets are preceded by a known training waveform that can be used by the receiver to estimate H to within some estimation accuracy. Other techniques for estimating H in packet-based communication are possible. For non-packet-based communication, mid-ambles and other techniques to estimate H exist.

The vector, $\hat{x}$, representing the most likely transmit vector x given what was received, can be represented as shown in Equation 3, wherein where X is the set (of size $c^M$) of all possible transmit vectors x.

$$\hat{x} = \arg\left(\min_{x \in X} \|y - Hx\|\right) \quad \text{(Equ. 3)}$$

Thus, the detector finds the most probably transmitted transmit vector x by finding the valid transmit vector that is "closest" to the received symbol vector y given the known channel characteristics from H. In order to find $\hat{x}$, the distance of received symbols from all possible received symbols, shown by the expression in Equation 4, is calculated for all x.

$$d[x] = \|y - Hx\| \quad \text{(Equ. 4)}$$

Once the most probably transmitted transmit vector is found, the receiver can output that as a hard decision for each of the bits of the transmit vector. Since each element of x is chosen from a set of c possible constellation values, the expression of Equation 4 needs to be evaluated $c^M$ times to determine the most probably transmitted transmit vector. Thus, computational complexity for determining the most probably transmitted transmit vector grows exponentially (proportional to $c^M$) with the number of transmit antennas (M), thus for larger values of c and M, the number of operations and calculations to decode the symbols represented by the vector x becomes prohibitive.

Herein, computational complexity refers to a measure of the computational effort required to arrive at a result, usually measurable by some combination of the number of operations needed to be performed for each calculation and the number of calculations needed (actually or on average) to reach the result. The operations can be software operations or hardware operations, or a combination, such as real or complex, fixed point or floating point, additions or multiplications. Computational complexity could correspond to the number of operations needed for computing a result, such as the average number of additions and multiplications needed. Computational complexity can be reduced by reducing the number of operations needed for each calculation or the nature of the operations (e.g., replacing a multiplication with an addition reduces complexity). Computational complexity can also be reduced by reducing the number of calculations needed. As explained in examples herein, if the expression of Equation 4 can be evaluated fewer than $c^M$ times, computational complexity will be reduced from the case where the expression is evaluated $c^M$ times even if the number of operations needed for each evaluation does not change. In addition, if the number of operations needed for each evaluation is reduced, computational complexity will be reduced further. Computational complexity can also be reduced by simplifying the individual operations, such as multiplying lower resolution values relative to the increased computational complexity of multiplying higher resolution values.

While a hard decision detector indicates its best guess for each bit of the transmit vector, a soft decision detector determines, for each bit of the transmitted transmit vector, a measure for the probability (the so-called log-likelihood ratio) that the transmitted bit was a "1" (or "0"), or does so for a collection of bits. The soft decision values provided by the soft decision detector can be quantized to reduce the result to hard decisions, or some other processing can be done to collectively reduce the result to hard decisions, such as using a trellis decoder.

For a soft decision detector, where the transmit vector contains $C = M \cdot (\log_2 c)$ bits, designated by $b_1 \ldots b_C$, the detector might find soft values for each bit $b_j$ according to Equation 5, where $L(b_i)$ represents the probability that $b_1$ was "1" at the transmitter and $\sigma^2$ is the power of the noise added on each antenna $E\{n_i^* n_i\}$, where $n_1, \ldots, n_N$, are stochastic variables with Gaussian distribution as introduced in Equation 2.

$$L(b_i) = \log\left(\frac{\sum_{x|b_i=1} \exp\left(-\frac{\|y - Hx\|^2}{\sigma^2}\right)}{\sum_{x|b_i=-1} \exp\left(-\frac{\|y - Hx\|^2}{\sigma^2}\right)}\right) \quad \text{(Equ. 5)}$$

The expression of Equation 5 can be approximated by the expression of Equation 6.

$$L(b_i) \approx \sigma^{-2} \cdot \left( \min_{x|b_i=-1} \|y - Hx\|^2 - \min_{x|b_i=+1} \|y - Hx\|^2 \right) \quad \text{(Equ. 6)}$$

For soft decision decoding, the distance expression $d[x]=\|y-Hx\|$ also has to be evaluated for all x. Since each element of x is from a constellation with c possible values, the expression is evaluated $c^M$ times. The soft decision values are found by finding a number of minima over sub-arrays of the array d[x]. There are 2B minima for $x_i$ to be found if there are B bits in the $x_i$ constellation. Again, this can be a difficult computation for some values of c and M.

It is possible to reduce computational complexity by modifying searches over all x. For example, in one approach, $2c^{M-1}$ distance metrics are evaluated instead of CM distance metrics using a subset search processes described in U.S. Pat. No. 7,245,666 [U.S. patent application Ser. No. 10/408,015 filed on Apr. 3, 2003 and entitled "Soft Symbol Decoding for MIMO Communication Systems with Reduced Search Complexity"], which is incorporated by reference herein for all purposes. As an illustration of such a complexity reduction by reducing the number of required distance metric calculations using a subset search process, the receiver might perform using program instructions for the subset search process described by the following pseudocode:

```
for (all x_1, x_2, ..., x_{M-1}) begin
    z = H_M*y - H_M*H_{M-1} x_{M-1} ... - H_M*H_1 x_1
    x_M = S(H_M*H_M, z)
    d[x_1, x_2, ..., x_{M-1}] = || y - Hx ||
end
```

In that pseudocode, S(t, z) denotes the slicing operation, with a grid spacing equal (or proportional) to t. The grid spacing is used to either divide z by t, after which it is compared to a set of fixed constellation thresholds, or alternatively, to multiply the constellation thresholds by t.

The soft values for all bits can be computed from the distance values $d[x_1, x_2, \ldots, X_{M-1}]$, except the bits in transmit symbol $X_M$. To obtain the soft values for the bits in $X_M$, the above process is repeated, but with a symbol other than $X_M$ excluded from the loop. The soft values for $X_M$ can be obtained from $d[x_2, x_3, \ldots, X_M]$ calculated in the second pass of the subset search process.

The above methods have in common that the computational complexity is dominated by the calculations ($c^M$, $2c^M$, $2c^{M-1}$ times, respectively) of d[x]. Simplifying calculation of d[x] further would reduce the computational complexity of determining the soft values.

One approach to dealing with decoding complications in MIMO systems is the use of tree detection. For example, see Vaton, S., Chonavel, T., Saoudi, S., "Approximate and Exact ML Detectors for CDMA and MIMO Systems: A Tree Detection Approach", MMT '02 Workshop on Multiaccess, Mobility and Teletraffic for Wireless Communications, Rennes, France, Jun. 3-5, 2002 [available at http://perso-info.enst-bretagne.fr/~vaton/mmt.ps] (hereinafter "Vaton"), which describes an exact ML detection technique with a computational complexity roughly equivalent to that of the decorrelator at usual SNRs for CDMA systems operation. Detection comprises two steps: (i) first, a QR decomposition of the matrix of users' signatures is performed for multi-user detection and (ii) the detection is performed as an optimal path selection in a tree diagram.

Vaton thus proposes QR preprocessing for maximum likelihood detection, wherein QR decomposition can be used to transform the MLD equations in a form that allows a tree formulation of the detection problem. It then discusses how two known tree search algorithms can be used to find a solution close to the optimal ("maximum likelihood, or "ML") solution. The only possible exact detector is an exhaustive search of the tree, which needs to evaluate the metric on all branches of the tree, so at best this approach finds an optimal solution and might not reduce computational complexity.

QR decomposition (sometimes referred to as "QR factorization") is a well-known technique and can be used to transform a channel matrix into an upper triangular matrix. In particular, a QR decomposition can be applied to the channel matrix H to find a matrix R such that H=QR and R is upper triangular. For a 2×3 matrix, for example, representing a MIMO system with M=2 transmit antennas and N=3 receive antennas, H can be factored as shown in Equation 7, where the diagonal elements of R ($r_{11}$, $r_{22}$, ...) are real numbers, and Q is a unitary matrix, i.e., Q*, the conjugate transpose of Q, is equal to its inverse: Q*Q=I.

$$\begin{bmatrix} h_{11} & h_{12} \\ h_{21} & h_{22} \\ h_{31} & h_{32} \end{bmatrix} = \begin{bmatrix} q_{11} & q_{12} & q_{13} \\ q_{21} & q_{22} & q_{23} \\ q_{31} & q_{32} & q_{33} \end{bmatrix} \begin{bmatrix} r_{11} & r_{12} \\ 0 & r_{22} \\ 0 & 0 \end{bmatrix} \quad \text{(Equ. 7)}$$

Because Q is unitary, R can be found by multiplying the conjugate transpose Q* by H. In geometrical terms, Q* rotates the vectors $H_1$ and $H_2$ such that $H_2$ is in the xy-plane and $H_1$ lies along the x-axis.

A MIMO detection process referred to as V-BLAST uses QR decomposition and provides a lower computational complexity than ML detection, but at the price of a lower performance. An example of such a decoding process would involve factoring H into Q and R and then searching over all possible combinations of the input symbols. Since V-BLAST selects input symbols one-by-one, this can be a source of inaccuracy that might need to be addressed in receiver designs.

BRIEF SUMMARY OF THE INVENTION

A MIMO receiver is provided with a preprocessor for performing full or partial QR decomposition of a channel matrix H wherein the factored reduced matrix R is used in place of H and Q*y is used in place of the received vector y in a maximum likelihood detector ("MLD") for a reduction in the computational complexity of computing shortest distances. For a full QR decomposition, R might be an upper right triangular matrix and Q a unitary matrix. The maximum likelihood detector might be a hard-decision MLD or a soft-decision MLD.

The MLD might use approximations in calculating distances, for example. Examples of MLD approximations include finite resolution calculations (fixed point or the like) or L1 Norm approximations. By using reduced matrix results, fewer operations are needed in each distance calculation, so any approximations or limits on resolution of the calculations will accumulate over fewer operations, resulting in improved approximations. Other methods of reducing the channel matrix might be used for suitable and/or cumulative advantages, such as partial QR decomposition, Gramm-Schmidt orthogonalizations, Householder transforms, and Given's rotations.

The received input signals could be received using distinct antennas and/or using polarization or other techniques to receive and/or transmit more than one stream over a given antenna. The number of receive antennas might be less than, equal to, or greater than three. The number of transmit antennas might be less than, equal to, or greater than the number of receive antennas. The channel matrix might be determined at the receiver by receiving a training signal and processing the training signal at the receiver. The channel is typically a wireless channel, but the receiver might also be implemented to receive signals over a constrained channel, such as a fiber optic channel.

A subset search might be included in a detection process, for further reduction of computational complexity.

The following detailed description together with the accompanying drawings will provide a better understanding of the nature and advantages of the present invention.

BRIEF DESCRIPTION OF THE DRAWINGS

FIG. 8 illustrates a floating point implementation of an optimized QR decomposition process.

DETAILED DESCRIPTION OF THE INVENTION

Figure 1:
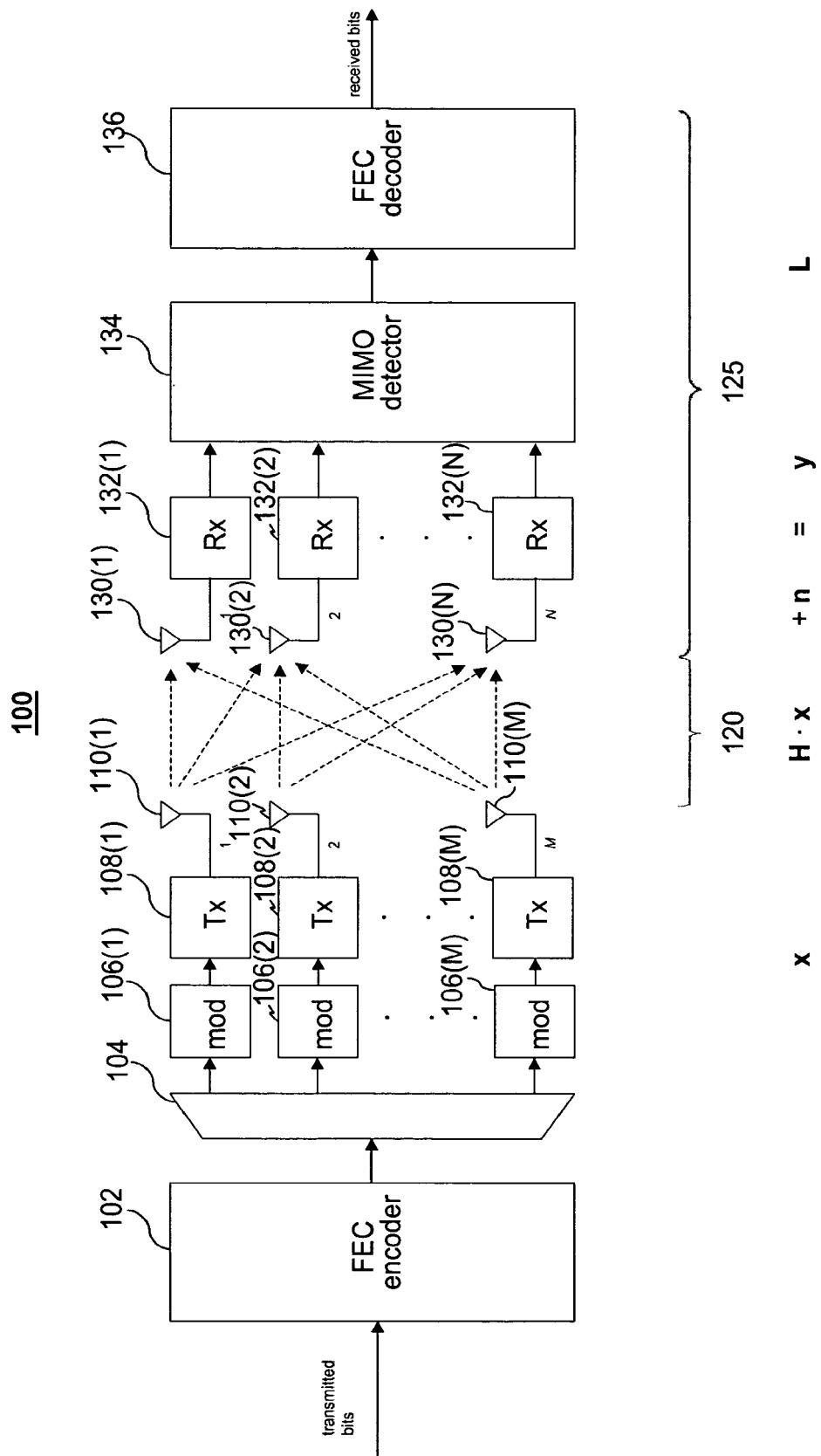
FIG. 1 is a block diagram of a MIMO system in which aspects of the present invention might be used.

In embodiments of a receiver according to aspects of the present invention, QR decomposition is used to reduce the number of operations required for detection. As a side effect, some approximations used in computation become less significant, thereby providing higher performance for a given level of precision or comparable performance using lower levels of precision.

Reducing computational complexity can relieve design constraints and/or allow for improved performance. For example, with reduced computational complexity, received signals can be processed faster for a given amount of hardware thus allowing higher data rates and, for a given data rate, received signals can be processed using less hardware, less power or fewer processing steps. In some instances, computational complexity can be reduced without affecting the resolution of the results, thus not lowering performance. Thus, a savings of computational complexity can be used to provide comparable results more quickly, using less circuitry, and/or requiring less consumed energy, or performance can be improved for a fixed amount of time, circuitry and/or energy.

For example, when implementing portions of the receiver using an application specific integrated circuit (ASIC), area usage and power consumptions can be expected to be reduced for a reduction in the computational complexity. On such an ASIC, a single adder can be used repetitively to do many additions and computational complexity reduction allows for a lesser number of additions in a given time, which means less activity for the hardware adder and thus less power consumption. Alternatively, each addition can be done by a dedicated adder and reduction of computational complexity means that fewer adders are needed, and thus less area is needed so a receiver could be implemented in a smaller chip with less power being consumed. These are ends of a spectrum, i.e., there can be multiple adders but still not as many as if no reduction were made. Computational complexity reduction will save power and potentially also area.

A number of techniques can be used to reduce computational complexity, not all of which are necessarily mentioned here. As an example of computational complexity reduction, the search space of considered transmitted signals can be less than all the possible transmitted signals. For example, for MIMO channel characterized by M transmit antennas and a constellation of size c, the set of all possible transmit vectors has $c^M$ members. The plurality of considered transmitted signals (i.e., the possible transmitted signals that are considered) can be less than all of the possible transmit vectors, with a corresponding computational complexity reduction. For example, the signals of one of the transmit antennas can be assumed and a search performed over the subset of $c^{(M-1)}$ possible signals from the remaining M−1 transmit antennas, reducing the number of calculations by an order of c. This is often referred to as a "subset search".

Another technique for complexity reduction is to reduce the number (and/or type) of operations for each of the calculations of distance metrics or other calculations that are part of a computation. A computation of a result is a process involving several calculations and can have complexity that is dependent on the number of calculations as well as the complexity of each of the calculations. For some computations, the number of calculations might vary, as the result might be obtained early or late, so designs might be according to a complexity metric that is proportional to an average number of calculations. One example of reduction is the use of QR transformations as described herein. As noted herein, the use of QR transformations in combination with calculation approximations, such as reducing the number of operations for each calculation by using L1 Norms for distances, results in more accurate results because there is less opportunity for rounding errors to accumulate.

Complexity reduction can also be obtained by approximating calculations. A calculation can be the evaluation of an equation, comprising several operations. As used herein, in operation might be considered as a single cycle, such as an addition or multiplication, real or complex, fixed point or floating point. The boundaries between computations, calculations and operations need not be precise.

Complexity reduction can be obtained by reducing the number of calculations needed for a computation, as well as by reducing the number of operations needed for each or some of the calculations. Complexity reduction can also be obtained by reducing the work done in each operation, such as by using rounding in operations. For example, fixed point numbers could be used in multiplication or addition operations to simplify the operations.

Note that some complexity reduction steps reduce accuracy, but others are not approximations and simply reduce the number of operations without modifying the results.

QR decomposition can be used to reduce the number of operations required for maximum likelihood detection in a MIMO receiver. A number of types of calculations can be simplified and one example is calculations of distance vectors in either a hard-decision based detector or a soft-decision based detector.

An important property of multiplication of an arbitrary vector by a unitary matrix is that the vector's length is preserved through the multiplication. This is expressed in Equation 8 showing distances from a multiplication of an arbitrary vector v by a unitary matrix Q.

$$\|Qv\|^2 = v^*Q^*Qv = v^*v = \|v\|^2 \quad \text{(Equ. 8)}$$

As a result, computations involving the channel matrix H and vector lengths can be done using the factored matrix R with the same results, as illustrated in Equation 9, where y'=Q*y for a unitary matrix Q obtained from a factorization of H.

$$\|y-Hx\|^2 = \|Q^*(y-Hx)\|^2 = \|y'-Rx\|^2 \quad \text{(Equ. 9)}$$

The unitary matrix Q can be obtained from a factorization of the channel matrix H into a Q and an R component. From Q, Q* can be obtained by conjugating all the elements of Q and transposing the resulting matrix. To obtain y', each received symbol y is rotated by left-multiplying it by Q*. Then, for an MLD process, such as one described herein or elsewhere, matrix R takes the role of H and y' takes the role of y, and the rest of the process can remain unchanged.

Since R contains a number of elements that are zero (every term beyond the upper triangular) and a number of elements that are real (the diagonal terms), the number of operations to evaluate d[x] using R is less than if H were used. With fewer operations, computation can be done faster and/or using less computing effort. In addition to the computational savings, use of the techniques described above results in improved accuracy, particularly where approximations are involved. Since calculations are necessarily done with a finite precision, when there are fewer operations, there is less accumulation of rounding errors, thereby improving accuracy of the calculations. If intentional approximations are used other than rounding, there would also be less accumulation of such approximations.

Using the above-described approach, the computational complexity of calculating d[x] can be independent of N (the number of receive antennas), as described below, for example, with reference to Equations 10-12. If the computational complexity is independent of N, the number of receive antennas can be increased to improve the receiver sensitivity without requiring extra computational effort. While the QR decomposition itself and the Q* pre-multiplication of y may require more operations for larger number of receive antennas, the number of operations required is typically much smaller than the number of operations required to calculate all d[x] values.

Referring now to the figures, FIG. 1 is a block diagram of a MIMO system 100 in which aspects of the present invention might be used. As illustrated there, bits to be transmitted via a channel are provided to a FEC encoder 102 that applies a forward error correcting code and provides the encoded data to a de-multiplexer 104 that distributes its input into M transmit streams. Each transmit stream is modulated by a modulator 106 and passed to a transmission circuit 108 that transmits the modulated transmit stream using an antenna 110 into a channel 120, such as a wireless radio space using some frequency band, such as those used for 802.11 transmissions. In some embodiments, antennas 110 are distinct and spatially separated antennas. In other embodiments, distinct signals might be combined into different polarizations off of fewer than M antennas.

A receiver 125 receives signals from channel 120 at N antennas 130 (counting separate polarizations, as appropriate) coupled to N receive circuits 132. The outputs of receive circuits 132 are provided to a MIMO detector 134, which provides its output to a FEC decoder 136, which in turn outputs the received bits which, without unrecoverable errors, are the same as the transmitted bits input to FEC encoder 102.

Vectors and matrices used in various equations described herein have been added below various elements shown in FIG. 1 for ease of understanding correspondence of the elements and the equations set forth here in text. For example, the output of modulators 106 is represented by the vector x and the channel effects are represented by the matrix H. With a noise contribution vector of n, the receiver receives y=Hx+n for processing and from that the receiver determines, as best it is able, what x might have been.

Figure 2:
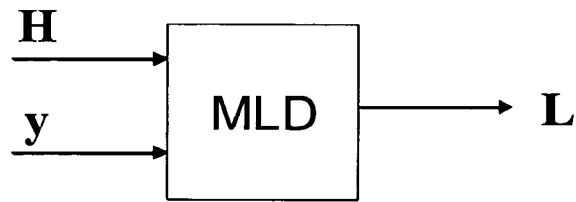
FIG. 2 illustrates one model of a conventional MIMO MLD.

FIG. 2 illustrates one model of a conventional MIMO ML detector, where the inputs to the detector comprise a channel estimate, H, an N-dimensional received symbol, y, and where the output of the detector comprises M ($\log_2$ c), where c is the constellation size and M is the number of transmit antennas. H typically, but not necessarily, remains constant for the duration of a data packet, whereas y can be expected to change each symbol period. Where the detector does hard-decision detection, the M·($\log_2$ c) bit outputs are bits (e.g., "0" or "1") and where the detector does soft-decision detection, the M·($\log_2$ c) bit outputs are soft-decision values.

Figure 3:
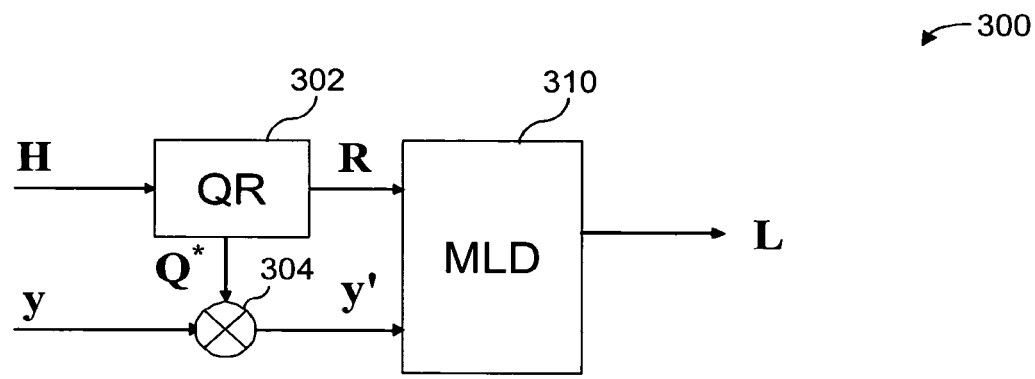
FIG. 3 is a block diagram of a MIMO MLD according to aspects of the present invention, including a QR preprocessor.

FIG. 3 illustrates a MIMO ML detector 300 according to aspects of the present invention. As shown there, a QR preprocessor 302 receives the channel estimate H and factors H into Q and R and outputs R. QR preprocessor 302 conjugates Q to produce Q*, which a multiplier 304 multiplies with the received symbol vector y to arrive at y'. The matrix R and the vector y' are provided as inputs to an MLD processor 310. In some embodiments, MLD processor 310 is constructed as described herein, but other implementations of an MLD processor could be used instead. An MLD processor that is configured to receive a channel estimate H matrix and a received symbol vector y can be used without modification, supplying instead the matrix R and the vector y', respectively.

Figure 4:
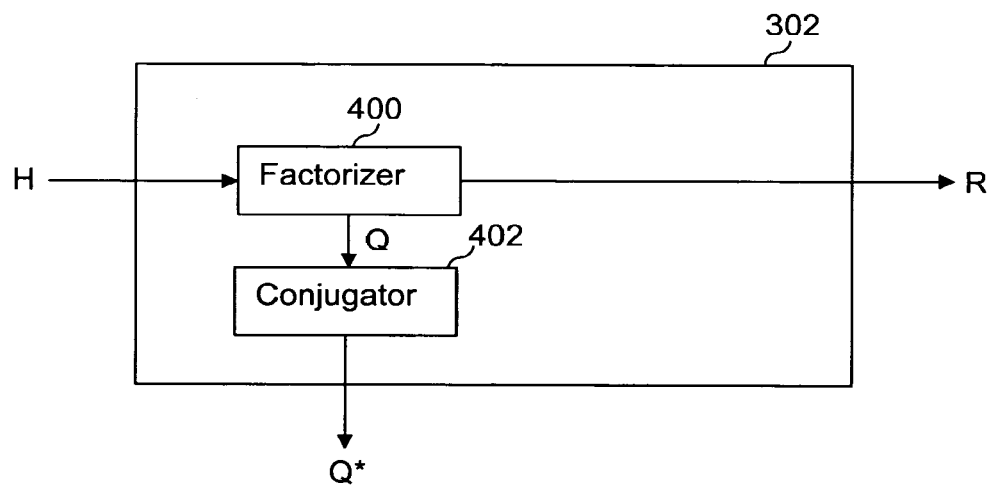
FIG. 4 is a block diagram of one example implementation of the QR preprocessor of FIG. 3 in greater detail.

FIG. 4 illustrates one example implementation of QR preprocessor 302 in greater detail. As shown there, QR preprocessor 302 receives channel estimate matrix H and provides it to a factorizer 400 that generates matrices Q and R. Data representing matrix Q is provided by factorizer 400 to a conjugator 402, which generates data representing the conjugate of matrix Q, namely the matrix Q*.

In many cases, because the QR preprocessor greatly reduces the number of operations required by the MLD processor to recover an estimate of the transmit vector, the MLD processor might be modified from the conventional processor to take into account this reduced computation requirement. For example, the MLD processor might be modified to use higher precision values for some calculations, might be modified to perform more operations in a given time, or other enhancements.

As explained below, even without modifications of the MLD processor, the performance of the receiver might be improved in that for finite precision implementations, the soft values are more accurate because less finite arithmetic is being performed, which translates to a better performing, more robust communications system.

Bases for the reduction in computational complexity will now be described.

Defining a vector z=y'−Rx, the distance metric d[x] can be represented as shown in Equation 10. The vector z is a function of x and other quantities known to the receiver (R, y), so z is expressed in Equation 10 as a function of x.

$$d[x]=\|z(x)\|^2=|z_1(x)|^2+\ldots+|z_N(x)|^2 \quad \text{(Equ. 10)}$$

Because only the first M rows of R contain non-zero elements, not all of the z terms are dependent on x and thus Equation 10 simplifies to Equation 11, which further simplifies to Equation 12, where K is a constant that is independent of x.

$$d[x]=\|z(x)\|^2=|z_1(x)|^2+\ldots+|z_M(x)|^2+|z_{M+1}|^2+\ldots+|z_N|^2 \quad \text{(Equ. 11)}$$

$$d[x]=\|z(x)\|^2=|z_1(x)|^2+\ldots+|z_M(x)|^2+K \quad \text{(Equ. 12)}$$

Since K is a constant that is independent of x, it does not play a role in determining the minimum of $\|y'-Rx\|$ for hard-decision detection and in the expression for the computation of the soft value, the K terms in the two minima terms cancel each other out. Thus, K might as well be chosen arbitrarily, for instance K=0. Now, instead of the computational complexity of calculating each distance metric d[x] being proportional to N, it can be reduced to a computational complexity proportional to M. This reduction is an advantage if N>M. For instance if M=2 and N=4, then the immediate computational complexity reduction of QR preprocessing is 50%.

Even further computational complexity reductions are provided in that additional terms of the matrix R are zero and a number of the terms are real numbers, e.g., multiplication by the diagonal elements is a real-by-complex multiplication rather than a complex-by-complex multiplication. That takes two real multiplications, rather than four real multiplications and two real additions. Additionally, the multiplications by the sub-diagonal elements are multiplications by zero, so they need not be performed, replacing a full complex-by-complex multiplication by an operation of zero complexity. Also, with fewer terms, fewer additions are required, which has an additional benefit in that quantization errors due to finite precision have less of an effect.

For the example, compare the 2×3 matrix (Hx) of Equation 13 with the 2×3 matrix (Rx) of Equation 14.

$$\begin{bmatrix} h_{11} & h_{12} \\ h_{21} & h_{22} \\ h_{31} & h_{32} \end{bmatrix} \cdot \begin{bmatrix} x_1 \\ x_2 \end{bmatrix} = \begin{bmatrix} h_{11}x_1 + h_{12}x_2 \\ h_{21}x_1 + h_{22}x_2 \\ h_{31}x_1 + h_{32}x_2 \end{bmatrix} \quad \text{(Equ. 13)}$$

$$\begin{bmatrix} r_{11} & r_{12} \\ 0 & r_{22} \\ 0 & 0 \end{bmatrix} \cdot \begin{bmatrix} x_1 \\ x_2 \end{bmatrix} = \begin{bmatrix} r_{11}x_1 + r_{12}x_2 \\ r_{22}x_2 \\ 0 \end{bmatrix} \quad \text{(Equ. 14)}$$

Note that, for Equation 14, only the $r_{12}x_2$ element requires complex multiplication, whereas Equation 13 requires six complex-by-complex multiplications. Also, one real addition is needed, instead of three complex additions (i.e., six real additions). This savings is obtained for each d[x] value that needs to be calculated for each new symbol y.

Of course, a QR preprocessor requires some added computation. However, the computation needed to perform QR decomposition need only be done once per packet (or after each change of the channel matrix, if that occurs more frequently), amortizing that extra computation over many symbols. The preprocessing step $y'=Q*y$ adds six complex multiplications per symbol, but only once per symbol and not for each d[x] value. Note that, in this example, the value of $y'_3$ is irrelevant because it only contributes to constant term K.

Indeed, since this extra QR computation is typically needed only once per OFDM packet, that computation can be done without much overhead. There is no overhead at all if the receiver would not have been doing anything anyway. For example, when the SIGNAL field portion of a packet is being received after the channel has already been characterized, but before MIMO decoding commences, the operations can be done so that none of the QR computation need be done during times when the receiver could be calculating d[x] values.

OR Decomposition with Subset Search SD MLD

The above examples describe reduction of computational complexity using QR preprocessing for an ML detector that may evaluate d[x] values for each of the $c^M$ possible values of x. QR preprocessing can also be used with "subset search" ML detectors that search over solution sets smaller than $c^M$ or search over the solution set in various passes to reduce computational complexity. As an example, consider a 2×N MIMO system employing a soft decision MLD process. QR preprocessing helps to reduce computational complexity and makes the resulting system more precise, which translates to a more robust link, with fewer bit errors.

An example of a subset search process is shown below, with the computation of $d[x_2]$ left out for conciseness:

```
for (each packet) begin
    for (all x1 in constellation) begin
        calculate and store scalar array a[x1] = H2*H1x1
        calculate and store vector array p[x1] = H1x1
    end
    for (each x2 in constellation) begin
        calculate and store vector array q[x2] = H2x2
    end
    for (each received symbol y) begin
        b = H2*y
        for (all x1 in constellation) begin // inner loop
            z = b - a[x1]
            x2 = S(H2*H2, z)
            d[x1] = || y - p[x1] - q[x2]||
        end
    end
end
```

A further simplification is that the norm computation $\|v\|=\text{sqrt}(\Sigma_i(\text{Re}(v_i)^2+\text{Im}(v_i)^2))$ (known as the L2 Norm) is approximated by $\|v\|\approx\Sigma_i(|\text{Re}(v_i)|+|\text{Im}(v_i)|)$ (known as the L1 Norm). In the pseudocode above, S(t, z) denotes the slicing operation, with a grid spacing equal (or proportional) to t. There, $\|.\|$ is the norm computation and, for brevity, $\|v\|$ refers to $\|y-p[x_1]-q[x_2]\|$. Such approximations reduce computational complexity.

The computational complexity of the process is dominated by the inner loop of the algorithm, which has $2^B$ iterations (where B is the number of bits in the constellation, so 2B is the number of constellation points). Each pass of the inner loop comprises one complex subtraction to compute z, B comparisons (equivalent to B real subtractions) to slice, 2N real additions to approximate the norm and 2N complex subtractions to compute the distance vector $d[x_1]$. Thus, the total complexity measured relative to one real addition is about the same as 2+B+6N real additions for the $x_1$ loop.

Now, as described above, if $R_1$ and $R_2$ (i.e., the channel vectors represented in the Q coordinate system) are used instead of $H_1$ and $H_2$, quite a number of operations can be skipped. Received symbol y can be first multiplied by Q* to yield y'. Since Q* is unitary, i.e., it is norm preserving, noise on y is not enhanced, it merely gets rotated. In other words, the problem can be represented in base Q, wherein the "per symbol" loop (again, only the $x_1$ loop is shown) would be as follows:

```
for (each received symbol y) begin
    y' = Q*y
    b = R₂*y'
    for (all x₁ in constellation) begin // inner loop
        z = b − a[x₁]
        x₂ = S(H₂*H₂, z)
        d[x₁] = ∥ y − p[x₁] − q[x₂]∥
    end
end
```

Values for $H_2^*H_2$ (used above in the calculation of $x_2$) and $H_1^*H_1$ (used in a similar calculation of $d[x_2]$) can be more easily obtained as $H_1^*H_1 = R_1^*Q^*QR_1 = r_{11}^2$ and $H_2^*H_2 = r_{11}^2 + |r_{12}|^2$. Also, $p[x_1] = R_1 x_1 = r_{11} x_1$ is an array of vectors with one non-zero element, $q[x_2] = R_2 x_2$ has only two non-zero elements in its vectors, and $a[x_1] = H_2^* H_1 x_1 = R_2^* R_1 x_1 = r_{21}^* r_{11} x_1$, resulting in fewer operations overall. Furthermore, for the norm calculation, the $3^{rd}$ element and beyond can be ignored since they are independent of the transmitted symbol. The constant term in the norm will cancel out in the soft value computation. Therefore, it suffices to calculate $d[x_1]$ as shown in Equation 15, where $v_1 = y_1 - r_{11} x_1 - r_{12} x_2$ and $v_2 = y_2 - r_{22} x_2$.

$$d[x_1] = |Re(v_1)| + |Im(v_1)| + |Re(v_2)| + |Im(v_2)| \quad \text{(Equ. 15)}$$

As before, there are $2^B$ iterations inside the inner loop, but each iteration only requires one complex subtraction to compute z, B comparisons (equivalent to B real subtractions) to slice, four real additions to approximate the (partial) norm and three complex subtractions to calculate the distance vector. Here, the total computational complexity measured relative to one real addition is about the same as $2+B+4+6=B+12$ real additions for the $x_1$ loop, as compared with $2+B+6N$ for the other method.

Additional Benefits

The use of QR preprocessing with ML detection yields interesting properties. For example, consider the case where N=3. Using QR preprocessing, the computational complexity of the inner loops goes from B+20 to B+12. For 64-QAM, that translates to a 30% lower computational complexity. For 16-QAM, the computational complexity is reduced by 33%.

Another interesting property is that the computational complexity is largely independent of N. One consequence of this is that receive antennas can be added without adding computational complexity to the ML detector. While the computational complexity of once-per-packet QR decomposition grows proportionally to N, this is amortized over many symbols and might be done prior to symbol receipt at the receiver. As an example, using H matrices is 80% more complex than using R matrices for N=4.

The additional step required of calculating $y'=Q^*y$ is relatively simple. For N=3, it is one-third the computational complexity of the calculation of the b values and is independent of N. With the matrix-vector multiplication required for the computation of y', computational complexity is proportional to six complex multiplications (the $3^{rd}$ and higher elements of y can be ignored) and four complex additions. That equates to 24 real multiplications and 20 real additions. Without the coordinate transform, the receiver needed to compute $H^*y$, ($b=H_1^*y$ for the first loop and $b=H_2^*y$ for the second loop), which required the exact same number of operations as the computation of $Q^*y$. Using the coordinate transform provided by QR preprocessing, it suffices to calculate $R^*y'$. Since R is upper triangular, and both $r_{11}$ and $r_{22}$ are real, this requires two real-by-complex multiplications, one complex multiplication and one complex addition, or the equivalent of eight real multiplications and four real additions, which is less than one third of the computational complexity of the calculation is of $H^*y$.

Example Hardware Implementations of a QR Decomposition

There are many algorithms to perform QR decomposition, including Gramm-Schmidt, Householder and Givens rotations. Below, one such method is given, based on Givens' rotations, which is practical to implement in hardware. If should be understood that other implementations might work as well.

QR decomposition of an arbitrary sized matrix can be decomposed in a number of 2×1 QR decompositions. Specifically, this involves determining a 2×2, unitary matrix, T, that rotates any complex 2×1 vector $(x\ y)^T$ to a real vector with a zero second component, such as that shown in Equation 16.

$$T \cdot \begin{bmatrix} x \\ y \end{bmatrix} = \begin{bmatrix} \sqrt{x^2 + y^2} \\ 0 \end{bmatrix} \quad \text{(Equ. 16)}$$

The matrix T can be split into a real matrix and a complex diagonal matrix as follows, where a and b are real numbers and c and d are complex numbers with modulus 1.

$$T = T_{real} \cdot T_{compl} = \begin{bmatrix} a & b \\ -b & a \end{bmatrix} \cdot \begin{bmatrix} c & 0 \\ 0 & d \end{bmatrix} \quad \text{(Equ. 17)}$$

$T_{compl}$ transforms the x and y components to real numbers without changing their moduli.

$$c = \frac{x^*}{|x|} \quad \text{(Equ. 18)}$$

$$d = \frac{y^*}{|y|}$$

Then, $T_{real}$ rotates the two-dimensional real vector until it lies on the x-axis. Thus, a is the cosine of the angle of the real vector and b is the sine.

$$a = \frac{|x|}{\sqrt{|x|^2 + |y|^2}} \quad \text{(Equ. 19)}$$

$$b = \frac{|y|}{\sqrt{|x|^2 + |y|^2}}$$

This transform, which rotates any complex vector, is the generalization of a CORDIC ("COordinate Rotation Digital Computer") rotor, such as described in Volder, J., *The CORDIC Trigonometric Computing Technique*, IRE Trans. Comput., pp. 330-334 (September 1959). A CORDIC rotor rotates two-dimensional real vectors.

Figure 5:
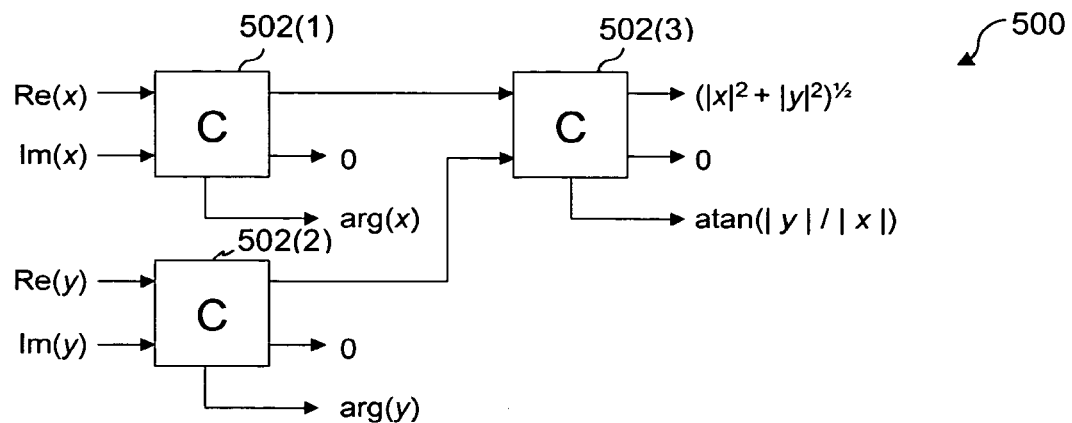
FIG. 5 is a block diagram of a complex CORDIC circuit usable in the factorizer shown in FIG. 4.

As shown in FIG. 5, a complex CORDIC 500 can be built using three real CORDICs 502. The CORDICs are used in a mode (rotate-and-store, also called vectoring) where they rotate the output vector forcing the second input to zero and store the angle (or alternatively, a binary vector denoting a sequence of clockwise and counter-clockwise micro-rotations). The stored angle can be read back and applied on arbitrary inputs to apply the exact same rotation. The latter mode is called read-and-rotate (also called rotation). Each complex CORDIC stores three angles, $\phi_1$, $\phi_2$ and $\phi_3$, corresponding to arg(x), arg(y) and arctan(|y|/|x|).

Figure 6:
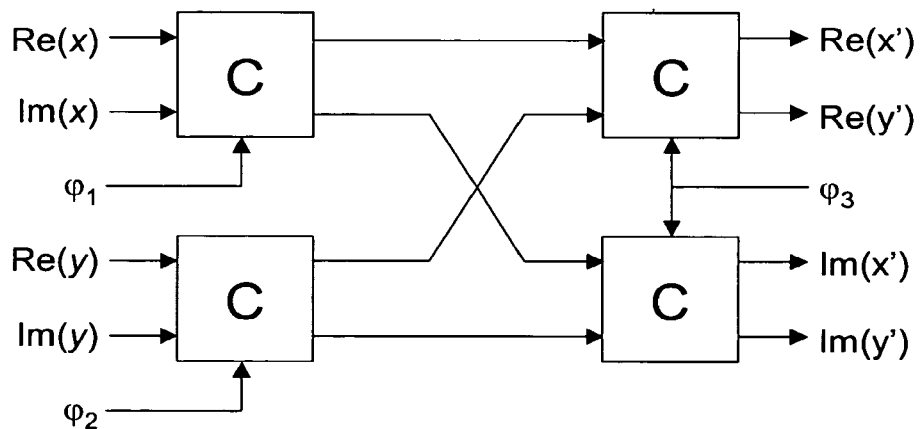
FIG. 6 is a block diagram of a CORDIC circuit for transforming rotations on arbitrary vectors.

FIG. 6 illustrates how these stored angles can then be applied to four real CORDICs to apply the same rotation to an arbitrary vector (x, y).

A QR decomposition of a 3×2 QR decomposition can be done with five complex CORDIC operations; three of the rotate-and-store type and two of the read-and-rotate type. The CORDICs are applied on subsets (indicated by the curly brackets) of the channel matrix as follows:

$$\text{rotate and store (1)} \begin{bmatrix} h_{11} & h_{12} \\ \{h_{21}\} & h_{22} \\ \{h_{31}\} & h_{32} \end{bmatrix} \rightarrow \begin{bmatrix} h_{21} & h_{12} \\ * & h_{22} \\ 0 & h_{32} \end{bmatrix} \quad \text{(Equ. 20)}$$

$$\text{read (1) and rotate} \begin{bmatrix} h_{11} & h_{12} \\ * & \{h_{22}\} \\ 0 & \{h_{32}\} \end{bmatrix} \rightarrow \begin{bmatrix} h_{11} & h_{12} \\ * & * \\ 0 & * \end{bmatrix} \quad \text{(Equ. 21)}$$

$$\text{rotate and store (2)} \begin{bmatrix} \{h_{11}\} & h_{12} \\ \{*\} & * \\ 0 & * \end{bmatrix} \rightarrow \begin{bmatrix} r_{11} & h_{12} \\ 0 & * \\ 0 & * \end{bmatrix} \quad \text{(Equ. 22)}$$

$$\text{read (2) and rotate} \begin{bmatrix} r_{11} & \{h_{12}\} \\ 0 & \{*\} \\ 0 & * \end{bmatrix} \rightarrow \begin{bmatrix} r_{11} & r_{12} \\ 0 & * \\ 0 & * \end{bmatrix} \quad \text{(Equ. 23)}$$

$$\text{rotate and store (3)} \begin{bmatrix} r_{11} & r_{12} \\ 0 & \{*\} \\ 0 & \{*\} \end{bmatrix} \rightarrow \begin{bmatrix} r_{11} & r_{12} \\ 0 & r_{22} \\ 0 & 0 \end{bmatrix} \quad \text{(Equ. 24)}$$

At this point, the channel matrix H has been transformed in upper triangular matrix R. Three angle triplets have been stored and can be read back to apply the same rotation to arbitrary three-dimensional vectors y (corresponding to multiplication y'=Q*y). Rotations (1), (2) and (3) are applied as follows on input vector y to yield rotated vector y':

$$\text{read (1) and rotate} \begin{bmatrix} y_1 \\ \{y_2\} \\ \{y_3\} \end{bmatrix} \rightarrow \begin{bmatrix} y_1 \\ * \\ * \end{bmatrix} \quad \text{(Equ. 25)}$$

$$\text{read (2) and rotate} \begin{bmatrix} \{y_1\} \\ \{*\} \\ * \end{bmatrix} \rightarrow \begin{bmatrix} y'_1 \\ * \\ * \end{bmatrix} \quad \text{(Equ. 26)}$$

$$\text{read (3) and rotate} \begin{bmatrix} y'_1 \\ \{*\} \\ \{*\} \end{bmatrix} \rightarrow \begin{bmatrix} y'_1 \\ y'_2 \\ y'_3 \end{bmatrix} \quad \text{(Equ. 27)}$$

Figure 7:
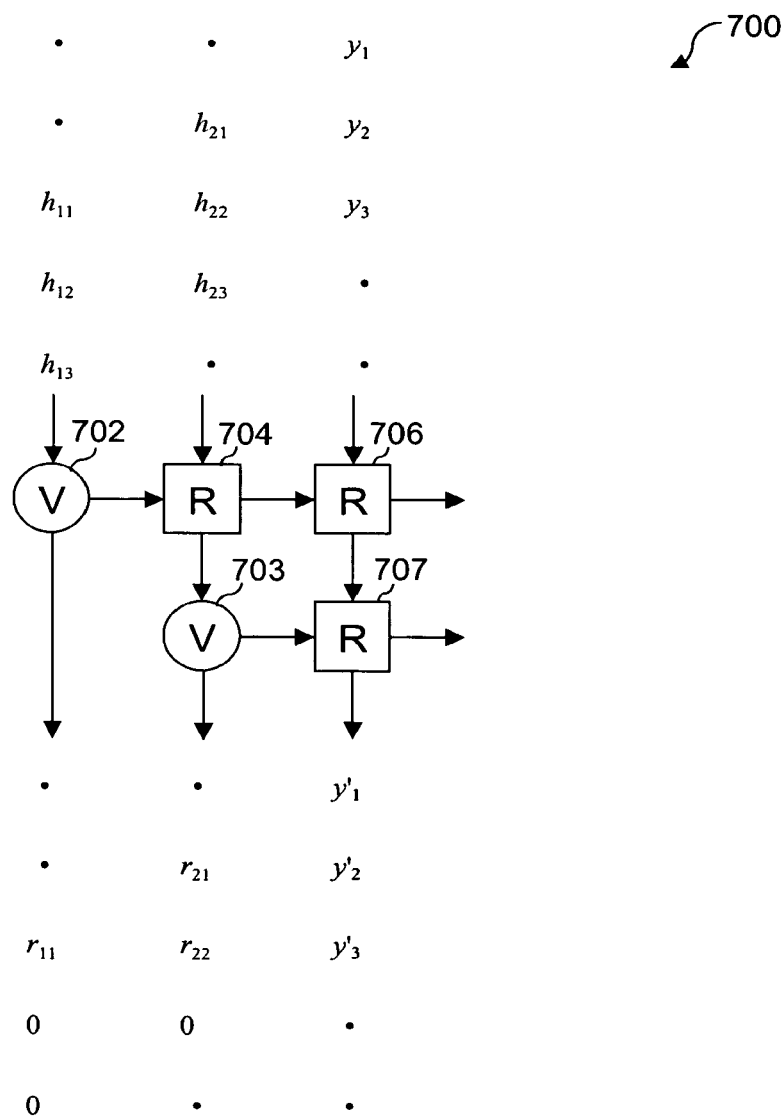
FIG. 7 illustrates one arrangement of CORDIC operations in a pipelined structure.

FIG. 7 illustrates one arrangement 700 of three CORDIC operations in a pipelined structure (a systolic array) comprising two vectoring (V) CORDICs 702, 703 and one rotating (R) CORDIC 704. FIG. 7 actually shows five CORDICs, where the leftmost three (702, 703, 704) are used for the QR decomposition itself, while the rightmost two CORDICs (706, 707) are used to rotate vector y. A single (complex) CORDIC can be reused to reduce the amount of hardware required. For minimum latency, five CORDICs can be used in parallel. For an intermediate solution, partial parallelism can be done using more than one CORDIC but less than five. To compare the amount of circuitry needed for a CORDIC rotator and a complex multiplier, three complex CORDICs require roughly the same circuitry components as six complex multipliers.

Example Software Implementations of QR Decomposition

FIG. 8 illustrates a floating point implementation of an optimized QR decomposition process. The implementation is described using pseudo C++ instructions in the figure, but it should be understood that other programming languages could be used to generate the instructions. The instructions in this process might be stored in an instruction memory within the receiver and executed by a general purpose processor within the receiver or executed by a processor configured to sequentially process instructions dedicated to the QR decomposition process. One important aspect of the process invokes complex and real CORDIC functions.

Sample Experimental Results

In this section, the effect of QR preprocessing on the performance of a two-transmitter ML detector and on the performance of a complete MIMO receiver with an MLD as well as forward error correction functionality.

Figure 9:
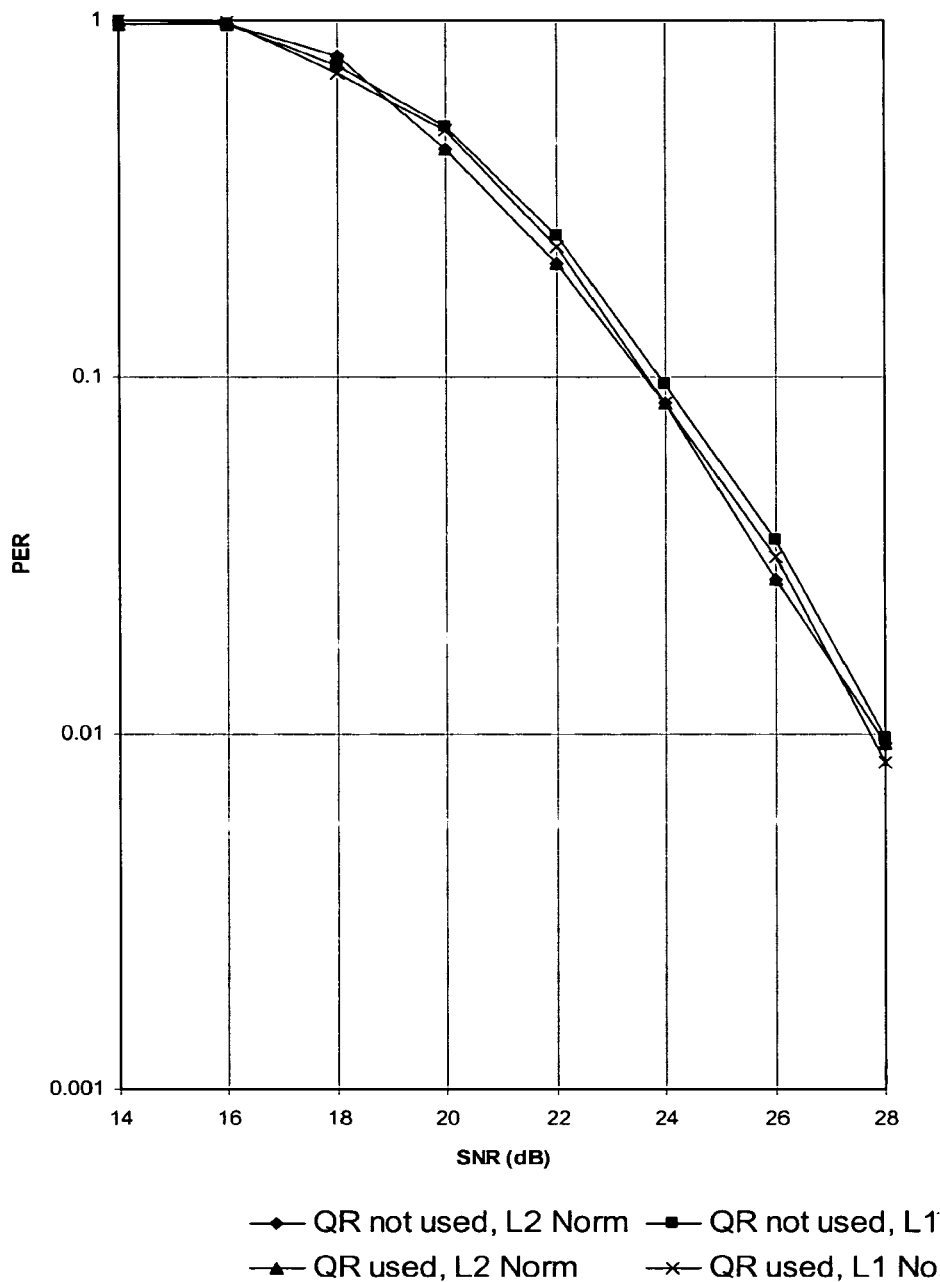
FIG. 9 is a plot of results from a performance simulation.

FIG. 9 shows results from a first performance simulation considering just the MLD. No FEC decoder is used; the bits are decoded by slicing the soft decision outputs (i.e., a decoded bit is "1" if the soft value is larger than 0, and the decoded bit is "0" if the soft value is less than 0. Data is transmitted in packets of 48 symbols. 64-QAM modulation is used, so each symbol codes for six bits, and thus the entire packet codes for 288 bits. The channel may change between packets.

FIG. 9 shows the Packet Error Rate (or "PER"; i.e., the probability that one or more of the bits in a packet is in error) for different signal-to-noise ratios (SNR) for different cases (QR preprocessing used/not used, exact L2 Norm vs. approximate L1 Norm). The signal-to-noise ratio is calculated as the ratio of the signal power to noise power. It should be clear from the results that the QR preprocessing does not affect the performance for the L2-based MLD, as the two plots for the L2 Norm are coincident, as is shown above, results can be obtained with much less computational complexity, thus cutting computational complexity with little performance sacrifice. This is to be expected because, as shown above, the Q* multiplication is vector length preserving and does not change the distance results. As illustrated in Equation 9, the use of y' and R in lieu of y and H is entirely equivalent to using y and H.

However, as Equation 9 relies on the equality shown in Equation 8 and that is only true if the L2 Norm is used, Equation 9 is not exactly an equality if other norms are used. In other words, $\|v\|$=L2_norm(v) but $\|v\|\approx$L1_norm(v), as the L2 Norm is sqrt(v*v)=sqrt($\Sigma_i$(Re($v_i$)$^2$+Im($v_i$)$^2$)) and the L1 Norm is $\Sigma_i$ (|Re($v_i$)|+|Im($v_i$)|). Also, the performance optimality of MLD assumes the L2 Norm is used.

Using the L1 Norm in the original MLD instead, a worse performance can be expected. The simulation confirms this, as the "QR not used, L1 Norm" curve has a higher PER for a given SNR than the "QR not used, L2 Norm" curve. However, when the QR preprocessing step is applied, the performance of the L1-based MLD improves. The "QR used, L1 Norm" curve is below the "QR not used, L1 Norm" curve but of course still above the L2 curves, as L2 is known to be optimal. This non-trivial result can be explained in that the MLD length calculation is reduced from determining the length of a three-dimensional (in general, N-dimensional) vector to determining the length of a two-dimensional (in general, M-dimensional) vector. For fewer dimensions, the L1 Norm approximation is closer to the exact value.

Figure 10:
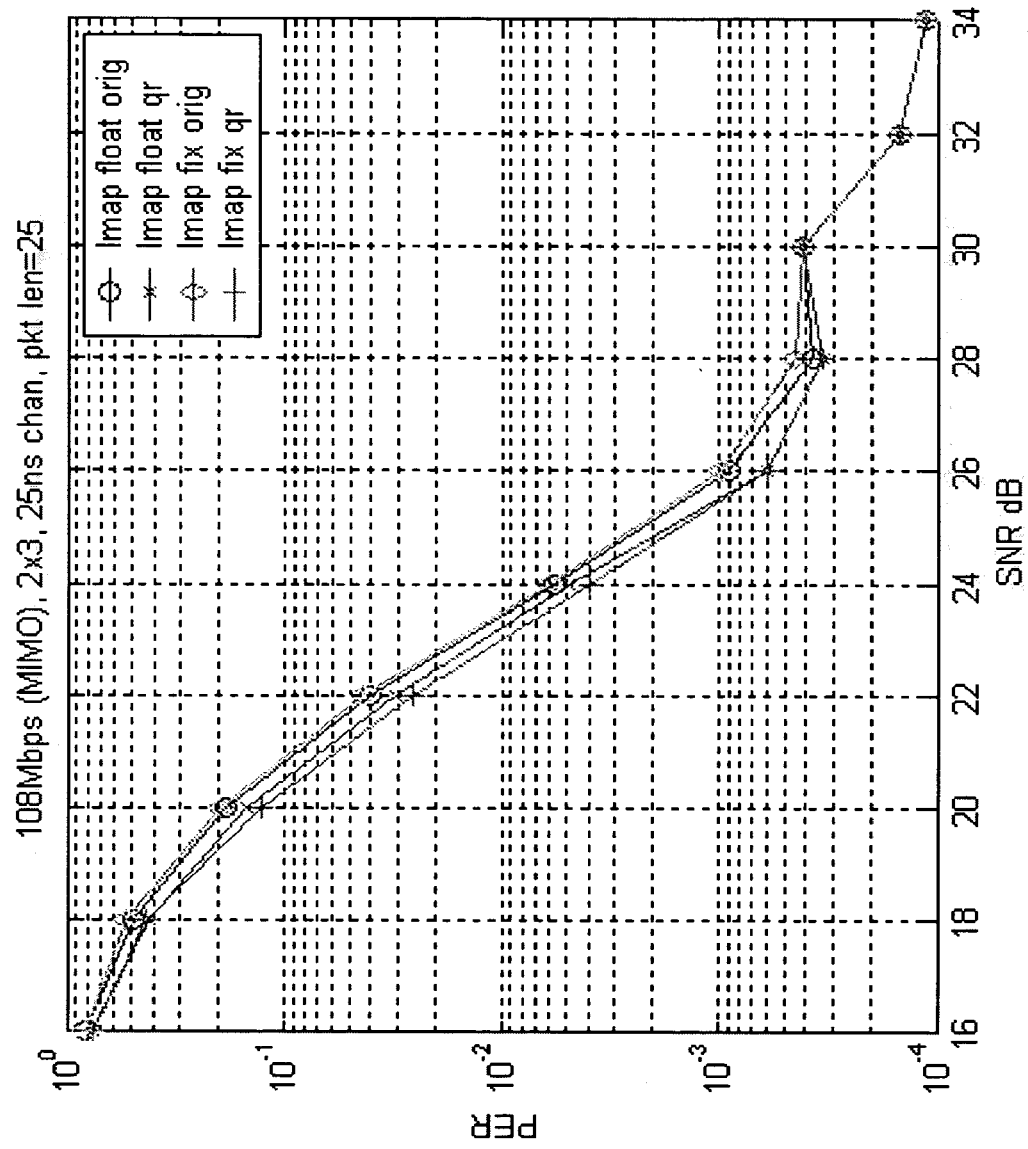
FIG. 10 is a plot of results from a performance simulation using an MLD and FEC for a multi-path propagation channel
Figure 11:
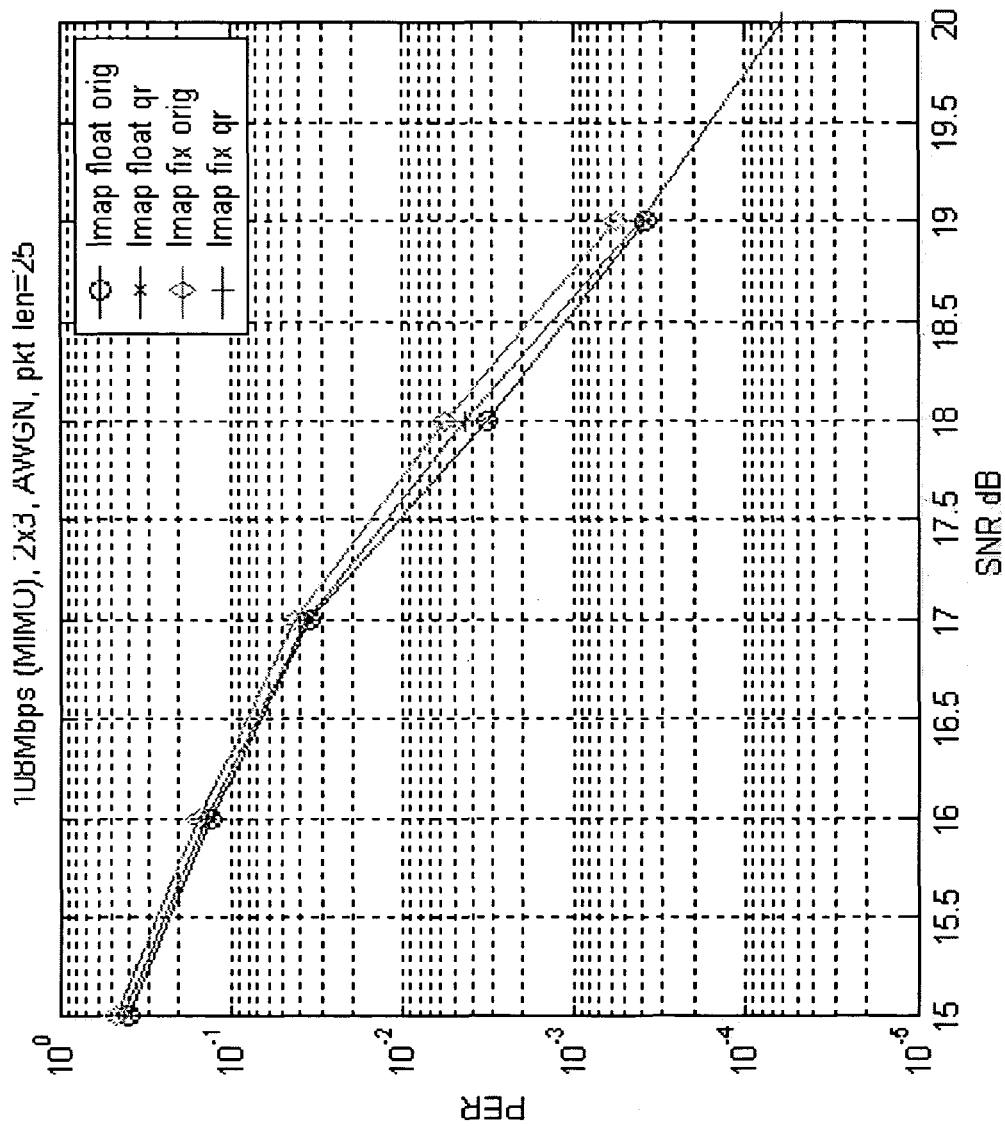
FIG. 11 is a plot of results from a performance simulation using an MLD and FEC for a zero delay spread channel.

FIGS. 10-11 illustrate results for more realistic simulations. In these simulations, a MIMO OFDM system including a soft-decision FEC decoder are modeled and channel estimation is done based on a training preamble and other realworld effects are modeled and taken into account. Both a full-precision floating point implementation as well as a fixed point implementation of the same system exists. In the graphs of FIGS. 10-11, "float" and "fix" curves are shown, representing floating point results and fixed point results respectively. Also, the propagation channel can be simulated more realistically by modeling multi-path propagation. The simulations use the L1 Norm approximation for vector length.

Resolution of fixed-point calculations might be selected according to design constraints balancing speed increases of lower resolutions versus bit error rate increases due to lower resolution, possibly also taking into account power limitations and decoding time constraints.

Two channels are simulated: one without multi-path propagation and one with a 25 ns RMS (root mean squared) delay spread. An infinite precision QR preprocessor is used for the fixed-point and floating point simulations. FIG. 10 shows the results for a multi-path propagation channel of 25 ns, and FIG. 11 shows the same simulations for a zero delay spread channel (also called Average White Gaussian Noise, or AWGN, channel).

FIG. 10 demonstrates that the fixed point implementation has a small performance loss compared to the floating point implementation. Surprisingly, the QR preprocessor improves both the fixed and floating point performance by up to 0.5 dB. The main reason for this because the precision of the L1 Norm calculation after QR preprocessing is improved. It also noteworthy that the fixed point implementation benefits more from QR preprocessing than the floating point implementation, as the QR preprocessing also provides a method of reducing the impact of fixed point approximation errors, simply because fewer operations need to be done and accumulation of quantization and rounding errors is reduced.

FIG. 11 confirms the results illustrated in FIG. 10, although the benefits are smaller in an AWGN channel than in a multi-path channel. Also, the QR processor itself has infinite precision. When QR preprocessing is performed by a fixed point arrangement, additional performance loss will result. This loss can be controlled by using sufficient resolution for the QR preprocessor. The impact of using high resolution is limited since the computational complexity needed to perform the QR preprocessing step using the preprocessor is small compared to that needed by the MLD to do its ML detection.

In the degenerate case of N×1 (MISO) systems, QR decomposition does not help, because H=R in that case, but for 1×N (SIMO) systems, it might be useful. In that case, H=QR expands as shown in Equation 28.

$$\begin{bmatrix} h_{11} \\ h_{12} \\ h_{13} \end{bmatrix} = \begin{bmatrix} q_{11} \\ q_{12} \\ q_{13} \end{bmatrix} \cdot [r_{11}] \quad \text{(Equ. 28)}$$

As can be seen there, it follows that $r_{11}=|h_{11}|^2+|h_{12}|^2+|h_{13}|^2$ and that finding the optimal transmitted symbol equates to finding $x_1$ in Equation 29. This is known in the field as "maximum ratio combining", a well-known process. See, for example Jakes, W. C., Jr., "Mobile Microwave Communication," Wiley (New York 1974).

$$x_1 = \text{Slice}\left(\frac{h_{11}^* \cdot y_1 + h_{12}^* \cdot y_2 + h_{13}^* \cdot y_3}{|h_{11}|^2 + |h_{12}|^2 + |h_{13}|^2}\right) \quad \text{(Equ. 29)}$$

Further Complexity Reduction

Additional complexity reduction can be provided be pre-calculating complex vectors and the use of error vectors. An example process is illustrated by the following pseudocode:

```
for (each packet) begin
    for (each x₂ in constellation) begin
        calculate and store vector array q[x₂] = R₂x₂    (Equ. 30)
    end
    for (each received symbol y) begin
        y' = Q*y                                          (Equ. 31)
        for (all x₂ in constellation) begin
            u = y' − q[x₂]                                (Equ. 32)
            x₁ = S_r11(u₁)                                (Equ. 33)
            d[x₂] = | u₂ |² |u₁ − r₁₁x₁|²                 (Equ. 34)
        end
    end
end
```

The precalculations that need to be done can be limited to a single array of two-dimensional complex vectors $q[x_2]=R_2x_2$ of Equ. 30. The estimation of $x_1$ in Equ. 33 and back-substitution in the distance calculation in Equ. 34 can be simplified. Instead of slicing and estimating the symbol $x_1$, an error vector, i.e., the difference vector between $u_1$ and the nearest constellation point, can be sliced and directly computed. So, Equ. 33 and 34 are replaced by:

$$v_1 = EV_{r11}(u_1) \quad \text{(Equ. 33')}$$

$$d[x_2] = |u_2|^2 + |v_1|^2 \quad \text{(Equ. 34')}$$

The new EV α(u) function (EV stands for Error Vector) operates on a complex value and returns a complex distance can be implemented as two identical real functions that each calculate the distance between the real and imaginary components of the distance and the real and imaginary component of the nearest constellation point, respectively.

What follows is an implementation of a real (PAM) EV calculation and the reader can extend this to the imaginary EV calculation.

Figure 12:
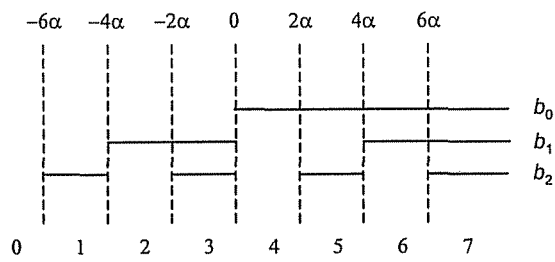
FIG. 12 is an illustration of a slicing process.

The constellation slicing thresholds are assumed to be as shown in FIG. 12. An integer number is used to denote which constellation point the received value is closest to.

The numbering scheme used is arbitrary since there is no need to calculate the transmitted symbol. The numbers denoting decision intervals are shown at the bottom of FIG. 12. These values are encoded by the concatenation of bits $b_0$, $b_1$, and $b_2$, shown to the right of the vector. The horizontal lines indicate the intervals where the associated bit has a value of "1". For the case of 64 QAM, $\{b_2\, b_1, b_0\}$ is used, for 16-QAM $\{b_0, b_1\}$ is used, while for QPSK and BPSK, $\{b_0\}$ suffices.

The slicing step can be implemented with two additions as follows:

$b0 = u \geq 0$;

$b1 = \text{diff1} \geq 0$ $b2 = \text{diff2} \geq 0$ where $\text{diff1} = \text{addsub}(b_0, u, 4\alpha)$ $\text{diff2} = \text{addsub}(b_0, u, 2\alpha)$ if $(b_0 \neq b_1)$ $\text{addsub}(b_0, u, 6\alpha)$ otherwise and where the function addsub( ) is an adder/subtractor (i.e., a function that has complexity essentially equal to an adder) defined as follows:

addsub(control,a,b)=a−b if control=1 a+b otherwise.

The decision thresholds $2\alpha$, $4\alpha$ and $6\alpha$ only need to be calculated once for each packet. The calculation of $2\alpha$ and $4\alpha$ can be trivially implemented by shift-left operations and $6\alpha=2\alpha+4\alpha$. After these calculations, the variable diff2 represents the distance of the received symbol to the nearest $2\alpha$ or $6\alpha$ decision boundary. The distance to the nearest constellation point is then found as $\alpha-|diff2|$. This can be implemented through another invocation of the addsub( ) function, as in: error=addsub($b_2$, $\alpha$, diff2).

Figure 13:
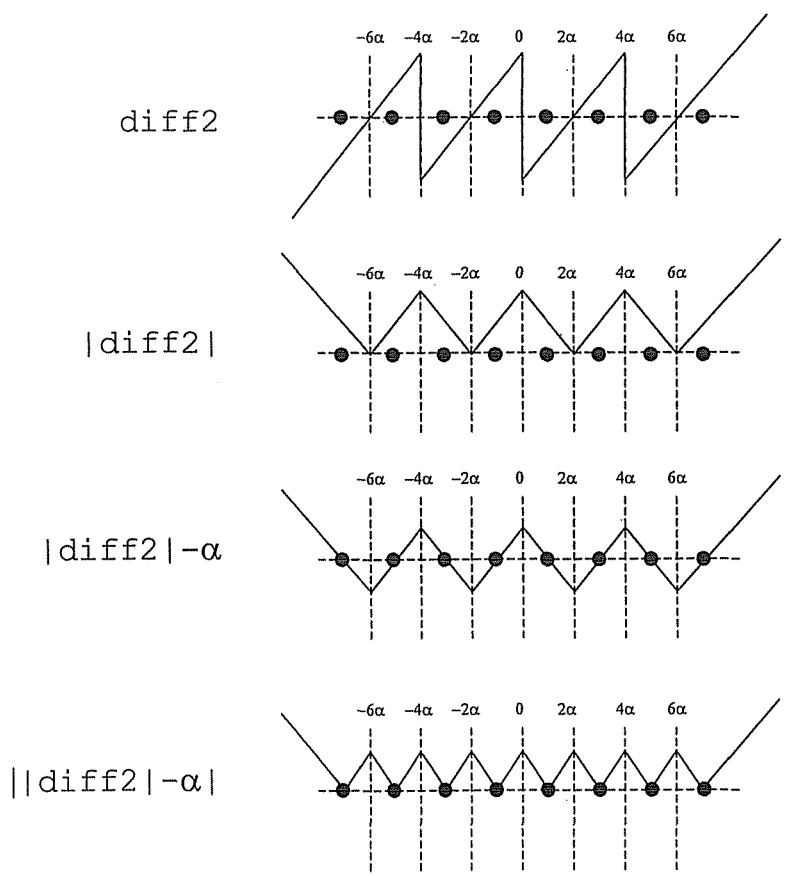
FIG. 13 is an illustration of a calculation process.

In total, both the real and imaginary component of the vector (complex number) between $u_2$ and the nearest to the nearest constellation point can be calculated using six add/sub operations. FIG. 13 below shows how diff2 is used to compute the distance to the nearest constellation point.

There are $2^B$ iterations inside the inner loop. In this loop, the steps are two complex additions to calculate u, B additions (equivalent to B real subtractions) to calculate the error vector and four real additions to approximate the (partial) norm. Thus, the total complexity in terms of real additions is $4+B+4=B+8$.

While the invention has been described with respect to exemplary embodiments, one skilled in the art will recognize that numerous modifications are possible. For example, the processes described herein may be implemented using hardware components, software components, and/or any combination thereof. The invention is also not limited as to the signaling constellation, FEC encoding scheme, or number of transmit antennas or receive antennas. Where described herein, a plurality of antennas might comprise individual antennas, preferably spatially separated but not necessarily so, but a single physical antenna might be used for more than one transmit stream or receive signal through the use of polarization or other techniques.

Thus, although the invention has been described with respect to exemplary embodiments, it will be appreciated that the invention is intended to cover all modifications and equivalents within the scope of the following claims.

What is claimed is:

1. A wireless receiver that receives a signal from a wireless multiple-input, multiple-output (MIMO) channel and detects from the received signal a maximum likelihood for a corresponding transmitted signal, the wireless receiver comprising:
    an input for receiving a symbol vector y;
    a preprocessor for receiving a channel matrix H, for calculating a triangular matrix R and a unitary matrix Q from the channel matrix H, and for calculating a conjugate unitary matrix Q* from the unitary matrix Q;
    a multiplier for multiplying the conjugate unitary matrix Q* and the symbol vector y to produce a rotated symbol vector y'; and
    a maximum likelihood detector that determines the maximum likelihood for the corresponding transmitted signal using a non-quadratic normal of the difference of the triangular matrix R and the rotated symbol vector y'.

2. The wireless receiver of claim 1, further comprising a channel matrix determiner that determines the channel matrix H from a training signal received by the wireless receiver.

3. The wireless receiver of claim 1, wherein the maximum likelihood detector is a hard-decision maximum likelihood detector.

4. The wireless receiver of claim 1, wherein the maximum likelihood detector is a soft-decision maximum likelihood detector.

5. The wireless receiver of claim 4, further comprising a decision element, whereby hard decisions are made from soft decisions.

6. The apparatus of claim 1, wherein determining the maximum likelihood for the corresponding transmitted signal comprises using distance comparisons for a plurality of considered transmitted signals, wherein a distance for a given considered transmitted signal x is at least an approximation of a distance between the rotated symbol vector y' and a multiplication of the matrix R and the given considered transmitted signal x.

7. The wireless receiver of claim 6, wherein the at least an approximation of a distance is a fixed-point approximation of distance.

8. The wireless receiver of claim 7, wherein a resolution of fixed-point calculations is selected according to design constraints balancing speed increases of lower resolutions versus bit error rate increases due to lower resolution.

9. The wireless receiver of claim 6, wherein the plurality of considered transmitted signals is a set of all possible transmitted signals.

10. The wireless receiver of claim 9, wherein the set of all of the possible transmitted signals comprises $c^M$ members and the maximum likelihood detector considers $c^{(M-1)}$ possible transmitted signals, wherein M is the number of transmit antennas used and c is the number of constellations possible for each transmit antenna.

11. The wireless receiver of claim 10, wherein N<M, where N is the number of receive antennas used.

12. The wireless receiver of claim 10, wherein N=M, where N is the number of receive antennas used.

13. The wireless receiver of claim 6, wherein the plurality of considered transmitted signals is less than all possible transmitted signals.

14. In a wireless receiver that receives a signal from a wireless multiple-input, multiple-output (MIMO) channel and detects from the received signal a maximum likelihood for a corresponding transmitted signal based on operations performed by the wireless receiver, a method of reducing an average number of operations per received symbol comprising:
    obtaining an input vector y comprising received signals from N outputs of the MIMO channel, N being an integer greater than one;
    obtaining a channel matrix H;
    calculating a triangular matrix R and a unitary matrix Q from the channel matrix H;
    calculating a conjugate unitary matrix Q* from the unitary matrix;
    multiplying the conjugate unitary matrix Q* and the symbol vector y to produce a rotated symbol vector y'; and
    calculating a maximum likelihood for each of a plurality of considered transmitted signals using a non-quadratic normal of the difference of the triangular matrix R and the rotated symbol vector y'.

15. The method of claim 14, wherein the plurality of considered transmitted signals is a set of all possible transmitted signals.

16. The method of claim 15, wherein the set of all of the possible transmitted signals comprises $c^M$ members, wherein M is the number of transmit antennas used and c is the number of constellations possible for each transmit antenna, and wherein calculating a distance metric comprises calculating a distance metric for a subset comprising $c^{(M-1)}$ of the possible transmitted signals.

17. The method of claim 14, wherein the plurality of considered transmitted signals is less than all possible transmitted signals.

18. The method of claim 14, wherein calculating a maximum likelihood for each of a plurality of considered transmitted signals using the triangular matrix R and the rotated symbol vector y' comprises:
   - calculating a distance metric for a given considered transmitted signal x, the distance metric at least an approximation of a distance between the rotated symbol vector y' and a multiplication of the matrix R and the given considered transmitted signal x; and
   - comparing distance metrics for each of the plurality of considered transmitted signals to determine a candidate transmitted signal having a minimum distance metric.

19. The method of claim 18, wherein calculating a distance metric includes determining at least some terms of the distance calculation that are independent of the given transmitted signal x and skipping calculations for at least one of those terms, thereby reducing the average number of operations per received symbol.

* * * * *